United States Patent
Danekar et al.

(10) Patent No.: US 12,184,185 B2
(45) Date of Patent: Dec. 31, 2024

(54) SYSTEMS AND METHODS FOR BRIDGE MODE TRANSITION AND DYNAMIC SOFT START FOR DC-DC CONVERTER AND BATTERY CHARGER

(71) Applicant: BorgWarner Luxembourg Automotive Systems S.A., Bascharage (LU)

(72) Inventors: Abhishek Vijay Danekar, Kokomo, IN (US); Alexandre M. S. Reis, Westfield, IN (US); Sunil Sreedhar, Carmel, IN (US); Venkata Jaya Sai Praneeth Ammanamanchi, Lamadelaine (LU)

(73) Assignee: BorgWarner US Technologies LLC, Auburn Hills, MI (US)

( * ) Notice: Subject to any disclaimer, the term of this patent is extended or adjusted under 35 U.S.C. 154(b) by 0 days.

(21) Appl. No.: 17/815,290

(22) Filed: Jul. 27, 2022

(65) Prior Publication Data
US 2024/0039413 A1 Feb. 1, 2024

(51) Int. Cl.
*B60L 53/30* (2019.01)
*H02J 7/00* (2006.01)
(Continued)

(52) U.S. Cl.
CPC ......... *H02M 3/33576* (2013.01); *B60L 53/30* (2019.02); *H02J 7/0047* (2013.01); *H02J 7/02* (2013.01); *H02M 1/08* (2013.01); *H02M 1/36* (2013.01); *H02M 1/4233* (2013.01); *H02M 3/33573* (2021.05); *B60L 2210/10* (2013.01); *H02J 2207/20* (2020.01)

(58) Field of Classification Search
CPC ...... H02M 3/33576; H02M 1/08; H02M 1/36; H02M 1/4233; H02M 3/33573; B60L 53/30; B60L 2210/10; H02J 7/0047; H02J 7/02; H02J 2207/02
USPC ........................................................ 307/98
See application file for complete search history.

(56) References Cited

U.S. PATENT DOCUMENTS 7,518,886 B1  4/2009  Lai et al.
8,416,591 B2  4/2013  Uehara
(Continued)

OTHER PUBLICATIONS

Linear Technology, 3A, Full Featured DC/DC Converter with Soft-Start and Inrush Current Protection, LT3479, pp. 1-20, retrieved from https://www.analog.com/media/en/technical-documentation/data-sheets/3479fc.pdf on Jun. 16, 2022.
(Continued)

*Primary Examiner* — Rexford N Barnie
*Assistant Examiner* — Xuan Ly
(74) *Attorney, Agent, or Firm* — Joshua M. Haines; Bookoff McAndrews, PLLC

(57) ABSTRACT

A system for a direct current (DC)-DC converter includes a transformer, a bridge driver connected to a primary side of the transformer, and a bridge rectifier connected to a secondary side of the transformer, wherein one or more switches in the bridge driver are operable to configure the bridge driver into each of a half-bridge driver configuration and a full-bridge driver configuration, and to transition between the half-bridge driver configuration and the full-bridge driver configuration while the DC-DC converter is outputting power.

16 Claims, 10 Drawing Sheets

(51) Int. Cl.
*H02J 7/02* (2016.01)
*H02M 1/08* (2006.01)
*H02M 1/36* (2007.01)
*H02M 1/42* (2007.01)
*H02M 3/335* (2006.01)

(56) References Cited

U.S. PATENT DOCUMENTS

2012/0049820 A1   3/2012   Moussaoui et al.
2014/0217999 A1*  8/2014   Wibben ................. G05F 1/468
                                                323/282
2018/0041130 A1*  2/2018   Kunz ................ H02M 3/33523
2018/0301934 A1* 10/2018   Prabhala ............. H02J 7/00714
2022/0337166 A1* 10/2022   Chan ................... H02M 1/4233
2023/0026817 A1*  1/2023   Choi ....................... H02M 3/01

OTHER PUBLICATIONS

International Search Report of Application PCT/EP2023/070154, dated Oct. 17, 2023 (13 pages).
Qu Lu et al: "Variable CLLC Topology Structure Technique for a Bidirectional on Board Charger of Electric Vehicle", 2019 4th International Conference on Power and Renewable Energy (ICPRE), IEEE, Sep. 21, 2019, pp. 185-189.
Liu Liming et al: "Stacked DC-DC Converter with Wide Voltage Range", 2019 IEEE Energy Conversion Congress and Exposition (ECCE), IEEE, Sep. 29, 2019, pp. 1401-1407.

* cited by examiner

SYSTEMS AND METHODS FOR BRIDGE MODE TRANSITION AND DYNAMIC SOFT START FOR DC-DC CONVERTER AND BATTERY CHARGER

TECHNICAL FIELD

Various embodiments of the present disclosure relate generally to systems and methods for a bridge mode transition and a dynamic soft-start for a DC-DC converter, and a battery charger including a DC-DC converter with bridge mode transition and dynamic soft-start for an electric vehicle.

BACKGROUND

In the field of battery chargers, a two-stage layout is generally used to meet a requirement for use in automotive vehicles as an onboard charger. These onboard chargers have high power density, with less weight and require less space. The configuration layout used in single-phase or three-phase chargers includes an alternating current (AC) to direct current (DC) Power Factor Correction (PFC) converter at stage I and an isolated DC-DC converter at stage II. Battery chargers are configured for specific applications, and may not operate at a high efficiency for different power requirements.

The present disclosure is directed to overcoming one or more of these above-referenced challenges.

SUMMARY OF THE DISCLOSURE

In some aspects, the techniques described herein relate to a system for a direct current (DC)-DC converter, the system including: a transformer; a bridge driver connected to a primary side of the transformer; and a bridge rectifier connected to a secondary side of the transformer, wherein one or more switches in the bridge driver are operable to configure the bridge driver into each of a half-bridge driver configuration and a full-bridge driver configuration, and to transition between the half-bridge driver configuration and the full-bridge driver configuration while the DC-DC converter is outputting power.

In some aspects, the techniques described herein relate to a system, further including: a controller configured to control the operation of the one or more switches.

In some aspects, the techniques described herein relate to a system, wherein the one or more switches include a first bridge driver switch and a second bridge driver switch on a first leg of the bridge driver, and a third bridge driver switch and a fourth bridge driver switch on a second leg of the bridge driver.

In some aspects, the techniques described herein relate to a system, wherein the controller is configured to control the operation of the one or more switches to configure the bridge driver into the half-bridge driver configuration by controlling the third bridge driver switch to be open and the fourth bridge driver switch to be closed.

In some aspects, the techniques described herein relate to a system, wherein the controller is further configured to control the operation of the one or more switches to configure the bridge driver in the half-bridge driver configuration when a sensed voltage of a battery connected to the DC-DC converter is in a low voltage region, to configure the bridge driver in either of the half-bridge driver configuration or the full-bridge driver configuration when the sensed voltage is in a nominal voltage region, and to configure the bridge driver in the full-bridge driver configuration when the sensed voltage is in a full voltage region.

In some aspects, the techniques described herein relate to a system, wherein the controller is further configured to, when the sensed voltage is in the nominal voltage region, check a power demand of the DC-DC converter, and when the power demand is less than a minimum transition threshold, operating the bridge driver in the half-bridge driver configuration, and when the power demand is more than a minimum transition threshold, operating the bridge driver in the full-bridge driver configuration.

In some aspects, the techniques described herein relate to a system, wherein the controller is further configured to ramp a current loop compensator output frequency lower limit from a maximum to a minimum with a predetermined soft start rate.

In some aspects, the techniques described herein relate to a system, wherein the controller is further configured to maintain a fixed duty cycle for the one or more switches, and vary a switching frequency of the one or more switches.

In some aspects, the techniques described herein relate to a system, wherein the controller is further configured to vary the switching frequency based on a comparison of a current reference signal and a measured current.

In some aspects, the techniques described herein relate to a system, wherein the DC-DC converter has a voltage operating range from approximately 170V to approximately 850V at a battery interface connected to the bridge rectifier.

In some aspects, the techniques described herein relate to a system, further including an alternating current (AC) to direct current (DC) Power Factor Correction (PFC) converter connected to the bridge driver to provide the system as a battery charger.

In some aspects, the techniques described herein relate to a system, further including: a battery connected to the DC-DC converter of the battery charger, and a motor configured to rotate based on power received from the battery, wherein the system is provided as a vehicle.

In some aspects, the techniques described herein relate to a system, wherein the battery charger is configured to: receive input AC power through the PFC converter, convert the AC power to DC power, and provide the DC power to the battery to charge the battery, and receive DC power from the battery through the DC-DC converter, convert the DC power to AC power, and provide the AC power through the PFC converter as output AC power.

In some aspects, the techniques described herein relate to a system, wherein the transformer includes a high-frequency transformer provided in a resonant tank.

In some aspects, the techniques described herein relate to a method for controlling a system including a direct current (DC)-DC converter including a transformer, a bridge driver connected to a primary side of the transformer, and a bridge rectifier connected to a secondary side of the transformer, the method including performing, by a controller, operations including: controlling one or more switches in the bridge driver to configure the bridge driver into each of a half-bridge driver configuration and a full-bridge driver configuration, and to transition between the half-bridge driver configuration and the full-bridge driver configuration while the DC-DC converter is outputting power.

In some aspects, the techniques described herein relate to a method, wherein the operations further include receiving a sensed voltage of a battery connected to the DC-DC converter, and wherein the controlling the switching operation includes controlling the operation of the one or more switches to configure the bridge driver in the half-bridge driver configuration when the sensed voltage is in a low voltage region, to configure the bridge driver in either of the half-bridge driver configuration or the full-bridge driver configuration when the sensed voltage is in a nominal voltage region, and to configure the bridge driver in the full-bridge driver configuration when the sensed voltage is in a full voltage region.

In some aspects, the techniques described herein relate to a method, wherein the operations further include ramping a current loop compensator output frequency lower limit from a maximum to a minimum with a predetermined soft start rate.

In some aspects, the techniques described herein relate to a method, wherein the operations further include maintaining a fixed duty cycle for the one or more switches, and varying a switching frequency of the one or more switches.

In some aspects, the techniques described herein relate to a method, wherein the varying the switching frequency of the one or more switches is based on a comparison of a current reference signal and a measured current.

In some aspects, the techniques described herein relate to a non-transitory computer readable medium storing instructions that, when executed by one or more processors, perform operations including: controlling one or more switches in a bridge driver of a DC-DC-converter to configure the bridge driver into each of a half-bridge driver configuration and a full-bridge driver configuration, and to transition between the half-bridge driver configuration and the full-bridge driver configuration while the DC-DC converter is outputting power.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to at least some of the disclosed systems and methods is a charger that may operate with a wide range of input voltages and generate a wide range of output voltages. An advantage to at least some of the disclosed systems and methods is a singular resonant topology that may offer a seamless transition between half-bridge and full-bridge modes of operation and vice versa depending upon the battery voltage and the output power conditions. An advantage to at least some of the disclosed systems and methods is a soft start operation that may be a software solution which ensures a smooth startup of the converter and determines the expected mode of operation (half-bridge or full-bridge) without requiring any additional hardware circuitry.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
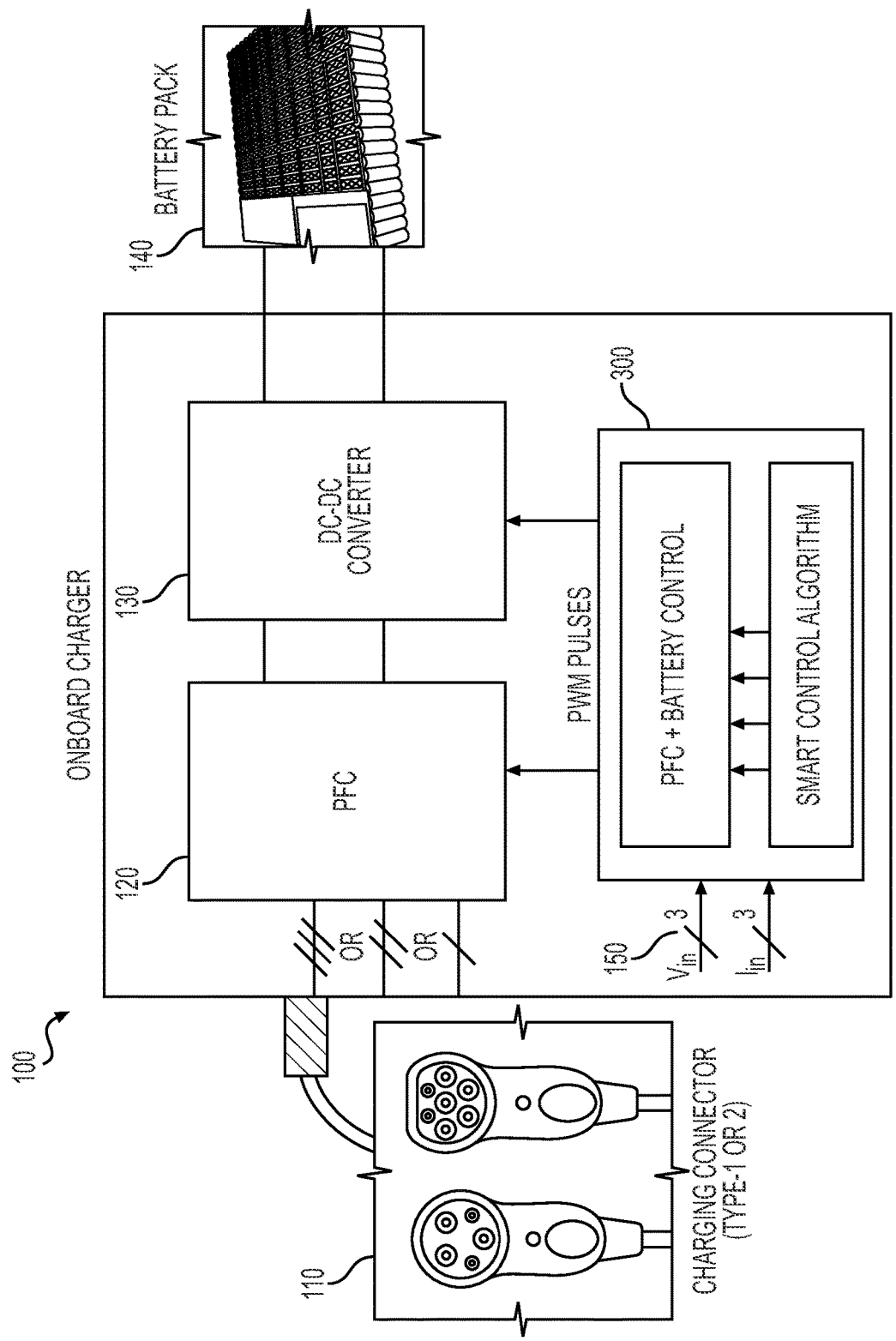
FIG. 1 depicts an exemplary system infrastructure for a battery charger, according to one or more embodiments.

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value. In this disclosure, unless stated otherwise, any numeric value may include a possible variation of ±10% in the stated value.

Various embodiments of the present disclosure relate generally to systems and methods for a bridge mode transition and a dynamic soft-start for a DC-DC converter, and a battery charger including a DC-DC converter with bridge mode transition and dynamic soft-start for an electric vehicle.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

In the field of battery chargers, a two-stage layout is generally used to meet a requirement for use in automotive vehicles as an onboard charger. These onboard chargers have high power density, with less weight and require less space. The configuration layout used in single-phase or three-phase chargers includes an alternating current (AC) to direct current (DC) Power Factor Correction (PFC) converter at stage I and an isolated DC-DC converter at stage II. The move in the automotive industry from 400 V to 800 V has created several issues in achieving high efficiency with better power density capabilities. The power levels of onboard chargers are increasing up to 11 kW and 22 kW operable with any type of grid input supply. The charging system with a single-phase or three-phase input power supply achieving charging capabilities at lower output battery voltages is difficult. Some methods may stabilize the DC link voltage at the PFC converter to a fixed or a variable voltage range to assist flexible operation at lower battery voltages, but have limitations with regard to output voltage ranges. A resonant-based DC-DC converter is preferred as the stage II converter due to good performance, and has been adopted in many charging applications. A few converters may operate at lower voltages, but have high losses, including switching losses, conduction losses, and stress on devices. The size of magnetic components to design for wide voltage ranges may result in bulky size. Moreover, the soft-start methods used in the DC-DC converter operation to limit the currents and achieve proper operating conditions are complicated and expensive.

According to one or more embodiments, a charger may operate with a single-phase or three-phase AC power source, and may possess higher efficiency without output voltage or power limitation. The disclosed method may provide operation of the DC-DC converter for different battery voltages. The charger may be designed to support a wide range of HVDC battery voltage ranges, for example, 400 V and 800 V systems and maximum output power of 11 kW and 22 kW.

To attain higher efficiencies at lower output voltages, the charger may be operated with the disclosed method. A DC-DC Converter with an LLC resonant structure may be used. A PFC converter with a single-phase or three-phase power supply may be employed.

In a lower HVDC battery voltage region, a full-bridge mode of operation may not satisfy lower output current conditions at a maximum switching frequency. Similarly, in a higher HVDC battery voltage region, a half-bridge mode of operation may not satisfy higher output current conditions at a minimum switching frequency. The charger may have a medium HVDC battery voltage region where both full-bridge and half-bridge modes satisfy the full output current range. Therefore, in order to provide a full output current range for a full HVDC battery voltage range, one or more embodiments may include a singular resonant topology which combines the half-bridge and full-bridge modes of operation.

An advantage of the singular topology is that it caters to a wide HVDC battery voltage range without requiring any additional hardware. Also, one or more embodiments do not require any hardware modifications to combine the half-bridge and full-bridge modes of operation. From a hardware standpoint, a singular resonant half-bridge DC-DC converter may be identical to a full-bridge DC-DC resonant converter, and one or more embodiments may provide software control of individual switches in the DC-DC resonant converter. According to one or more embodiments, a singular resonant topology may offer a seamless transition between the half-bridge and full-bridge modes of operation and vice versa depending upon the HVDC battery voltage and the output power conditions.

A switching bridge on a primary side of the DC-DC converter includes two legs, where each leg includes two switches. When the converter is in the half-bridge mode, switches on one leg are deactivated (held open and closed, respectively). Consequently, in the half-bridge mode, only switches on one leg are alternately operated in opposite cycles, where each switch in the activated leg has a 50% on-off or closed-open duty cycle.

When the HVDC battery voltage is in the medium HVDC battery voltage region and the output power demand is above a threshold, the converter may perform a half-bridge to full-bridge mode transition. During the transition, the unused leg in the half-bridge mode is activated. Consequently, switches on both legs of the switching bridge may be alternately operated in opposite cycles, where each switch has a 50% on-off or closed-open duty cycle.

When the HVDC battery voltage is in the medium HVDC battery voltage region and the output power demand is below a threshold, the converter may perform a full-bridge to half-bridge mode transition. During the transition, switches on one leg are deactivated (held open and closed, respectively, so that one switch on the deactivated leg maintains a 100% duty cycle and the other switch on the deactivated lag maintains a 0% duty cycle). Consequently, in the half-bridge mode, only switches on one leg are alternately operated in opposite cycles, where each switch in the activated leg has a 50% on-off or closed-open duty cycle. The switching bridge gain in the half-bridge mode is half of the full-bridge mode.

Accordingly, by controlling the operation of the switches in the switching bridge, the half-bridge to full-bridge mode transition and vice versa may be achieved and may be based on the output voltage to enhance the charging capabilities of the converter.

One or more embodiments may charge the lower battery voltage with variable power. The current may be increased to provide enough charging time even at lower battery voltages. The disclosed method used for the mode transition may be used an 800 V battery system. The maximum voltage of the battery pack may be variable. The threshold values may be selected by a user based on power levels of the charger.

One or more embodiments may include the PFC (AC to DC) converter and the DC-DC converter stages. The PFC converter may receive AC input from the grid and convert the AC power into a DC voltage and charge an intermediate bulk capacitor. The DC-DC converter receives the DC input from bulk capacitor and converts the DC input into a required HV battery voltage. The soft start operation may be employed at the DC-DC stage to ensure that there are no transients at the bulk capacitor and the HVDC battery.

According to one or more embodiments, the DC-DC stage of the charger may regulate the HVDC battery voltage and current to an expected setpoint. The voltage compensator may regulate the HVDC battery voltage to a voltage reference received from a vehicle. The output of the voltage compensator may be a current reference signal. The current compensator may receive the current reference signal from the voltage compensator, compare the current reference signal against a measured HVDC battery charging current, and generate a switching frequency signal for the switches used in the DC-DC converter. The relationship between the switching frequency and the measured HVDC battery charging current may ensure that there are no transients in the HVDC battery.

At startup, if the HVDC battery charging current demand is maximum, then the current compensator may generate the corresponding switching frequency to regulate to the expected current reference as quickly as possible. However, this may generate large transients at the battery which may damage the battery. Therefore, one or more embodiments may regulate the measured HVDC battery charging current to the reference current smoothly.

A soft start operation may ensure a smooth startup of the converter. Traditionally, a soft start operation is achieved by additional hardware circuitry in the DC-DC converter. The analog circuit slowly ramps up a duty cycle of the DC-DC converter switches to achieve the smooth startup of the converter. However, the hardware circuitry increases the footprint of the board, adds cost, and does not provide flexibility of operation.

According to one or more embodiments, a soft start operation may be a software solution which ensures a smooth startup of the converter and determines the expected mode of operation (half-bridge or full-bridge) without requiring any additional hardware circuitry. Also, digital control loops (such as voltage and current compensators, for example) may be used for the voltage and current regulation.

According to one or more embodiments, a soft start operation may use the HVDC battery voltage and the HVDC battery charging current reference as inputs. With these two inputs, the algorithm may automatically select an appropriate mode of operation between half-bridge or full-bridge and the appropriate switching frequency to regulate to the required HVDC battery charging current. The soft start operation may be programmed to have variable startup rates. Also, the soft start operation may be scalable based on charger, battery, or vehicle requirements.

According to one or more embodiments, a soft start algorithm may check if the HV battery voltage measured is within a half-bridge or full-bridge operating range and set the PWM configuration accordingly. When the mode of operation is determined, the initial switching frequency for the switches may set to maximum and the soft-start current reference, which is typically a smaller HV battery charging current value, may be set. Once the PWM configuration is set, the lower limit of the current loop output may start ramping down the switching frequency from the maximum value to the minimum value with a predetermined soft start rate.

According to one or more embodiments, during the ramp down of the switching frequency, the measured HV battery charging current and the soft-start current reference may be compared continuously in order to ensure the current is properly regulated. When the measured current is regulated to the soft-start current reference, the current loop limits may be broadened to the maximum and minimum values, and the soft-start current reference may be smoothly ramped up to the actual HV battery charging current demand.

According to one or more embodiments, the soft-start algorithm may also detect if the current regulation conditions are met as expected and if the soft start operation ends within a specified time window. This information may be used to perform appropriate diagnostics.

A battery charger according to the disclosure may operate with multiple types of AC input power supplies, including single phase, split/dual/two phase, and three-phase power supplies. The charger may be compatible with a wide range of operation. The algorithms may ensure the operation of the converter with wide variations in input voltages to generate a wide range of output voltages. An Inductor-Inductor-Capacitor (LLC) converter may be used as a second stage converter using a DC link voltage generated from the PFC as the input voltage for the converter. However, the disclosure is not limited thereto.

A battery charger according to the disclosure may possess higher efficiency without output voltage or power limitation. An algorithm according to the disclosure may provide operation of the configurable DC-DC converter for different battery voltages. The input and output layout of the charger may follow automotive standards. A battery charger according to the disclosure may include a two-stage configuration, including an AC-DC power factor correction converter stage and an isolated DC-DC converter stage. The isolated DC-DC converter may include a full-bridge driver configuration with resonant tank elements to achieve better efficiency. The DC-DC converter may be designed to charge the battery back from minimum voltage to maximum voltage.

A battery charger according to the disclosure may operate as a battery charger only, or operate bidirectionally for a charging operation or a power supply operation. The converter may either receive power from an AC power source and provide DC power to a battery, or receive power from the battery and provide power as an AC power source. A vehicle to grid (V2G) operation may be achieved with a designed control strategy for single-phase, two-phase, and three-phase systems. The switches may be any devices, such as GTO, thyristors, or MOSFETs/IGBTs with series diodes, for example. These switches may also be mechanical components (such as relays or contactors) if sufficient failure rates and arcing conditions during operation are met.

FIG. 1 depicts an exemplary system infrastructure for a battery charger with a DC-DC converter, according to one or more embodiments.

As shown in FIG. 1, a battery charger 100 may include or be electrically connectable to a charging connector 110. The charging connector 110 may provide an electrical connection from an external power supply to the battery charger 100, and may be a Type 1 or a Type 2 connector, for example. The charging connector 110 may transfer single phase, two-phase, or three phase power.

The battery charger 100 may include a Power Factor Correction (PFC) converter 120, a DC-DC converter 130, and a controller 300 receiving signals from input sensor 150. The battery charger 100 may include or be electrically connectable to a battery 140. The battery charger 100 may be used in automotive vehicles as an onboard charger to transfer power from an external power source through charging connector 110 to battery 140, or to transfer power from battery 140 in a vehicle to grid operation. The battery charger 100 may be included in a system provided as an electric vehicle including a motor configured to rotate based on power received from the battery 140.

Figure 2:
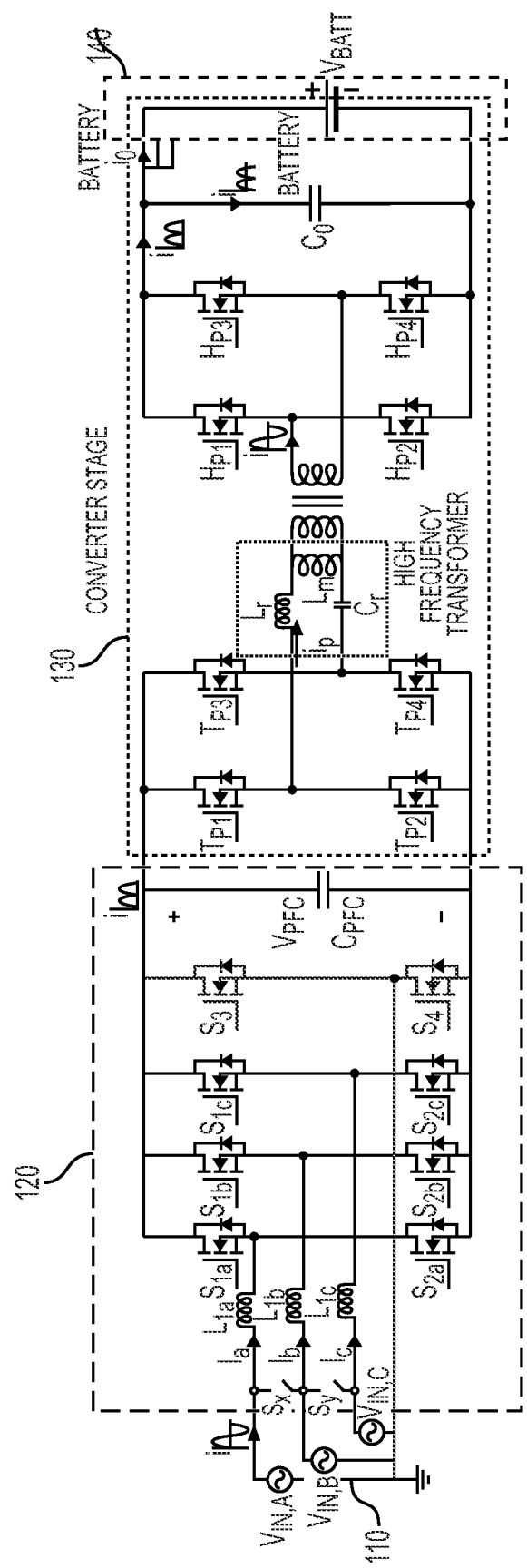
FIG. 2 depicts an exemplary electrical schematic for a battery charger with a DC-DC converter, according to one or more embodiments.

FIG. 2 depicts an exemplary electrical schematic for a battery charger with a DC-DC converter, according to one or more embodiments.

As shown in FIG. 2, the PFC converter 120 according to the disclosure may contain four legs of switches that may be operated with all types of input power supplies, and with universal input voltages. The four legs of switches may be provided as follows: phase A including switches S1a and S2a, phase B including switches S1b and S2b, phase C including switches S1c and S2c, and a neutral phase including switches S3 and S4. The input voltage from connector 110 may be sensed and the PFC converter 120 may be switched to operate in three-phase, two-phase, or single-phase operation.

PFC converter 120 may also include switches Sx and Sy respectively provided between phases A and B and between phases B and C from the connector 110. All switches described in the disclosure may be any devices such as GTO, thyristors, or MOSFETs/IGBTs with series diodes, for example. These switches may also be mechanical components (such as relays or contactors) if sufficient failure rates and arcing conditions during operation are met.

Additionally, PFC converter 120 may include inductors L1a, L2a, and L3a provided on phases A, B, and C, respectively between the switches Sx and Sy and the phase A, B, and C switches. Capacitor Cpfc may be provided as a DC link capacitor at an output of PFC converter 120 with a voltage Vpfc to an input of DC-DC converter 130.

DC-DC converter 130 may be any suitable converter operable to isolate the PFC converter 120 from battery 140. For example, DC-DC converter 130 may be an LLC converter as illustrated in FIG. 2, or may be a CLLLC converter.

The bi-directional battery charger 100 may be a system including PFC converter 120. PFC converter 120 may include a first (e.g. A) phase switch group (e.g. switches S1a and S2a) connected to a first node from connector 110 to receive power from a first phase of a voltage source (e.g. Vin,a). The system may include a second (e.g. B) phase switch group (e.g. switches S1b and S2b) connected to a second node from connector 110 to receive power from a second phase of a voltage source (e.g. Vin,b). The system may include a third (e.g. C) phase switch group (e.g. switches S1c and S2c) connected to a third node from connector 110 to receive power from a third phase of a voltage source (e.g. Vin,c). The system may include a neutral phase switch group (e.g. S3 and S4) connected to a fourth node from connector 110 to be connected to a ground terminal of the voltage source.

PFC converter 120 may include a first switch (e.g. Sx) connected to the first node and the second node, and a second switch (e.g. Sy) connected to the second node and the third node.

PFC converter 120 may include an input sensor 150 configured to sense a voltage and/or a current of each phase of the voltage source. PFC converter 120 may include a controller 300 configured to, based on the sensed voltage and/or current from input sensor 150, determine a phase of the voltage source, and, based on the determined phase of the voltage source, control an operation of the first, second, third, and neutral phase switch groups (e.g. S1a and S2a, S1b and S2b, S1c and S2c, and S3 and S4) and an operation of the first and second switches (e.g. Sx and Sy).

DC-DC converter 130 may be connected to outputs of the first, second, third, and neutral phase switch groups. A voltage source may be connected to one or more of the first, second, third, and fourth nodes of the PFC converter 120, and a battery 140 may be connected to an output of the DC-DC converter 130.

This control structure may provide wide variation in the PFC DC link voltage to attain a desired battery voltage. The battery charger 100 may operate bidirectionally. A vehicle to grid (V2G) operation may also be achieved with a designed control strategy for single-phase, two-phase, and three-phase systems. The PFC converter 14 may be configured to receive DC power from the battery 140 through the DC-DC converter 130, convert the DC power to AC power, and provide the AC power through one or more of the first, second, third, and fourth nodes. A requested voltage phase may include single-phase, two-phase, and three-phase operation. The controller 300 may be designed with an algorithm so that, based on the requested voltage phase, controller 300 may control an operation of the first, second, third, and neutral phase switch groups and an operation of the first and second switches to provide the AC power through the one or more of the first, second, third, and fourth nodes.

The controller 300 may be designed with and/or configured to run an algorithm for control of the first, second, third, neutral phase, and first and second (e.g. Sx and Sy) switches to provide a desired DC link voltage Vpfc that is suitable for the DC-DC converter 130 to charge the battery 140. The algorithm may be designed for both balanced and unbalanced power supplies to ensure the proper PFC operation is provided to charge the battery 140 with reduced voltage and current ripple. The DC link voltage may be variable, such as from 300V to 900V, for example, to attain the desired output voltage to battery 140.

The controller 300 may be designed with and/or configured to run an algorithm for control of the switches of the DC-DC converter 130, including primary side bridge driver switches Tp1, Tp2, Tp3, and Tp4 and secondary side bridge rectifier switches Hp1, Hp2, Hp3, and Hp4.

Figure 3:
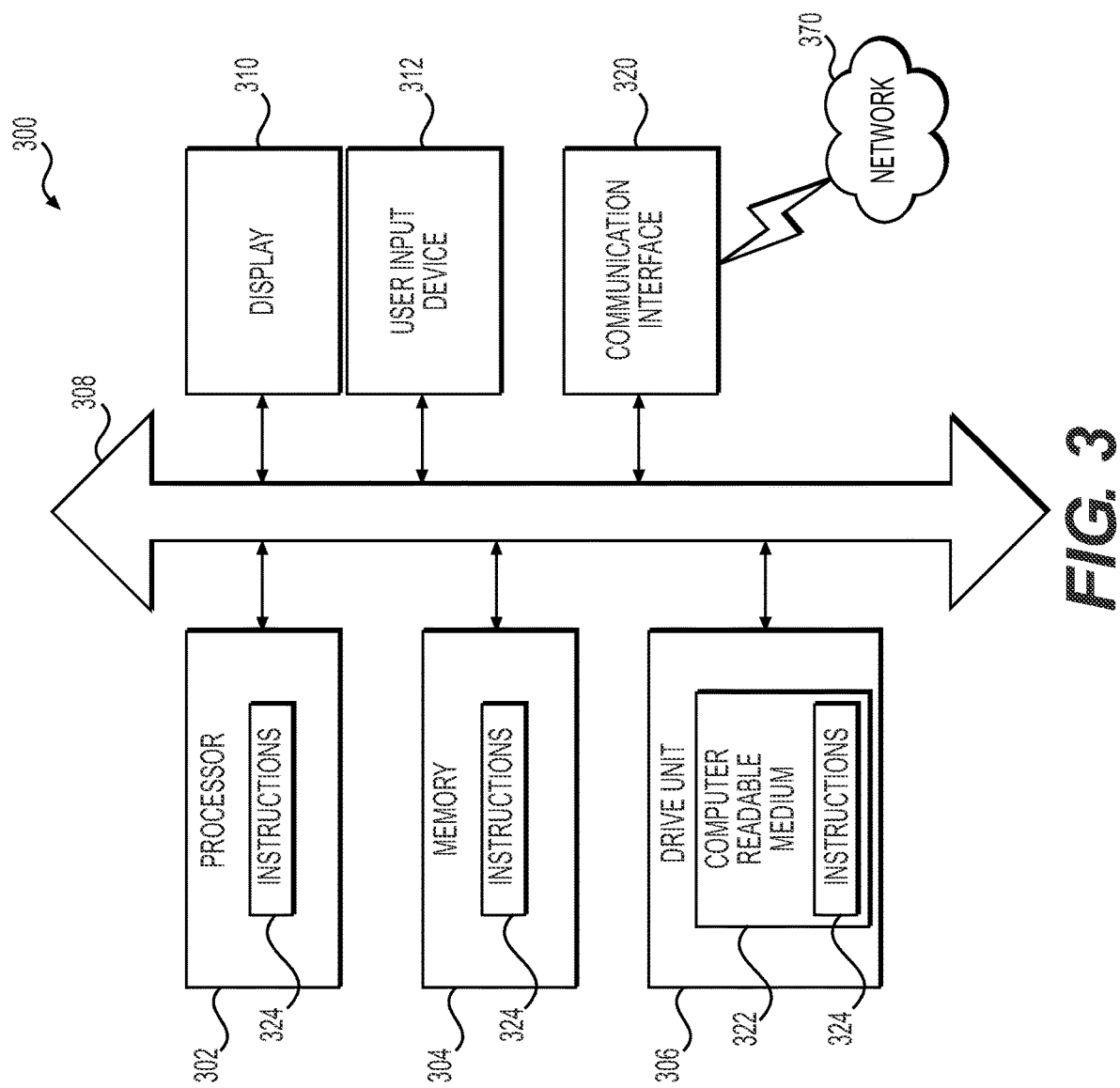
FIG. 3 depicts an implementation of a computer system that may execute techniques presented herein, according to one or more embodiments.

FIG. 3 depicts an implementation of a controller 300 that may execute techniques presented herein, according to one or more embodiments.

Any suitable system infrastructure may be put into place to allow control of the battery charger. FIG. 3 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIG. 3. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

The controller 300 may include a set of instructions that can be executed to cause the controller 300 to perform any one or more of the methods or computer-based functions disclosed herein. The controller 300 may operate as a standalone device or may be connected, e.g., using a network, to other computer systems or peripheral devices.

In a networked deployment, the controller 300 may operate in the capacity of a server or as a client in a server-client user network environment, or as a peer computer system in a peer-to-peer (or distributed) network environment. The controller 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the controller 300 can be implemented using electronic devices that provide voice, video, or data communication. Further, while the controller 300 is illustrated as a single system, the term "system" shall also be taken to include any collection of systems or sub-systems that individually or jointly execute a set, or multiple sets, of instructions to perform one or more computer functions.

As illustrated in FIG. 3, the controller 300 may include a processor 302, e.g., a central processing unit (CPU), a graphics processing unit (GPU), or both. The processor 302 may be a component in a variety of systems. For example, the processor 302 may be part of a standard computer. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The controller 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the controller 300 may include an input device 312 configured to allow a user to interact with any of the components of controller 300. The input device 312 may be a number pad, a keyboard, or a cursor control device, such as a mouse, or a joystick, touch screen display, remote control, or any other device operative to interact with the controller 300.

The controller 300 may also or alternatively include drive unit 306 implemented as a disk or optical drive. The drive unit 306 may include a computer-readable medium 322 in which one or more sets of instructions 324, e.g. software, can be embedded. Further, the instructions 324 may embody one or more of the methods or logic as described herein. The instructions 324 may reside completely or partially within the memory 304 and/or within the processor 302 during execution by the controller 300. The memory 304 and the processor 302 also may include computer-readable media as discussed above.

In some systems, a computer-readable medium 322 includes instructions 324 or receives and executes instructions 324 responsive to a propagated signal so that a device connected to a network 370 can communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or interface 320 may be configured to connect with a network 370, external media, the display 310, or any other components in controller 300, or combinations thereof. The connection with the network 370 may be a physical connection, such as a wired Ethernet connection or may be established wirelessly as discussed below. Likewise, the additional connections with other components of the controller 300 may be physical connections or may be established wirelessly. The network 370 may alternatively be directly connected to a bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random-access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The controller 300 may be connected to a network 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be configured to couple one computing device to another computing device to enable communication of data between the devices. The network 370 may generally be enabled to employ any form of machine-readable media for communicating information from one device to another. The network 370 may include communication methods by which information may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 4:
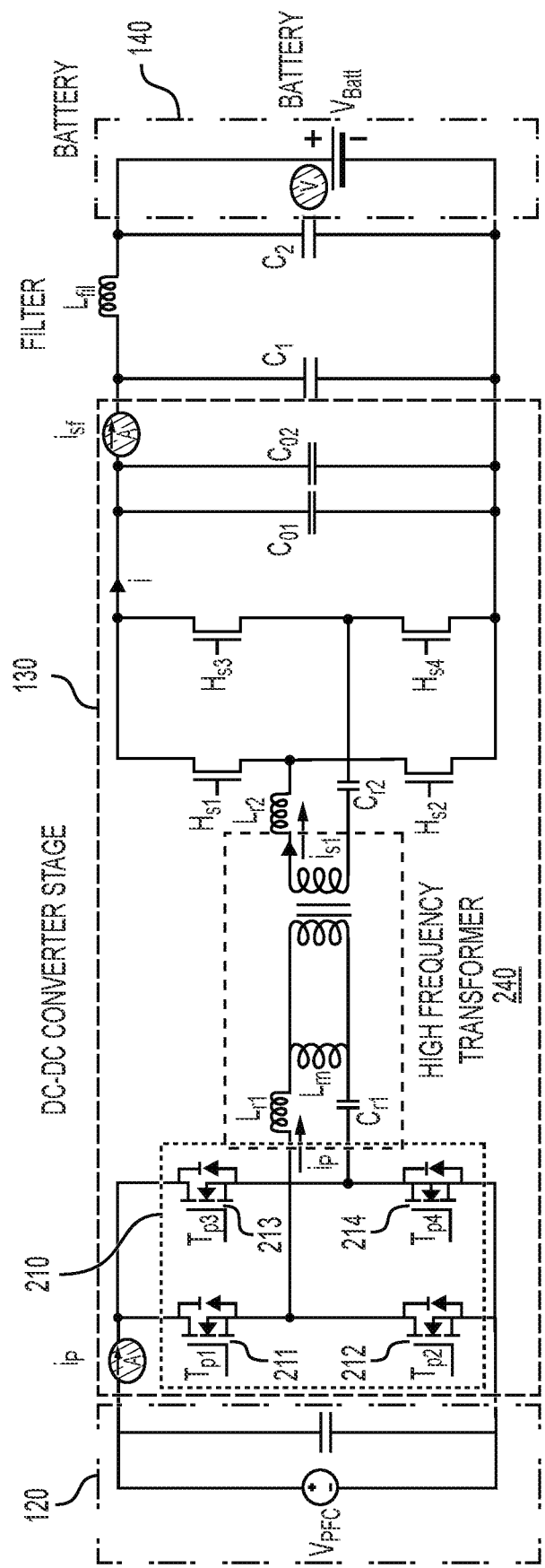
FIG. 4 depicts an exemplary electrical schematic for a battery charger with a DC-DC converter in a full bridge driver operation, according to one or more embodiments.

FIG. 4 depicts an exemplary electrical schematic for a battery charger with a DC-DC converter in a full bridge driver operation, according to one or more embodiments. The structure of battery charger 100 is described above, with reference to FIG. 2.

As shown in FIG. 4, battery charger 100 may be configured to operate in a full bridge driver configuration on a primary side of transformer 240. For the full bridge driver operation, switches on the primary side of transformer 240 may be controlled so that primary first switch 211, primary second switch 212, primary third switch 213, and primary fourth switch 214 are operated to generate a voltage signal.

As shown in FIG. 4, battery charger 100 may be configured to operate in a full bridge driver configuration on a primary side of transformer 240. For example, the full bridge driver operation may be used in a full voltage region 830 (see FIG. 8) when a voltage of battery 140 ranges from 650 V to 850 V, for example. However, the disclosure is not limited thereto. The full bridge driver operation may be used for any operation of the battery charger 100 as desired, and the full voltage region 830 may range between any appropriate voltage levels.

Figure 5:
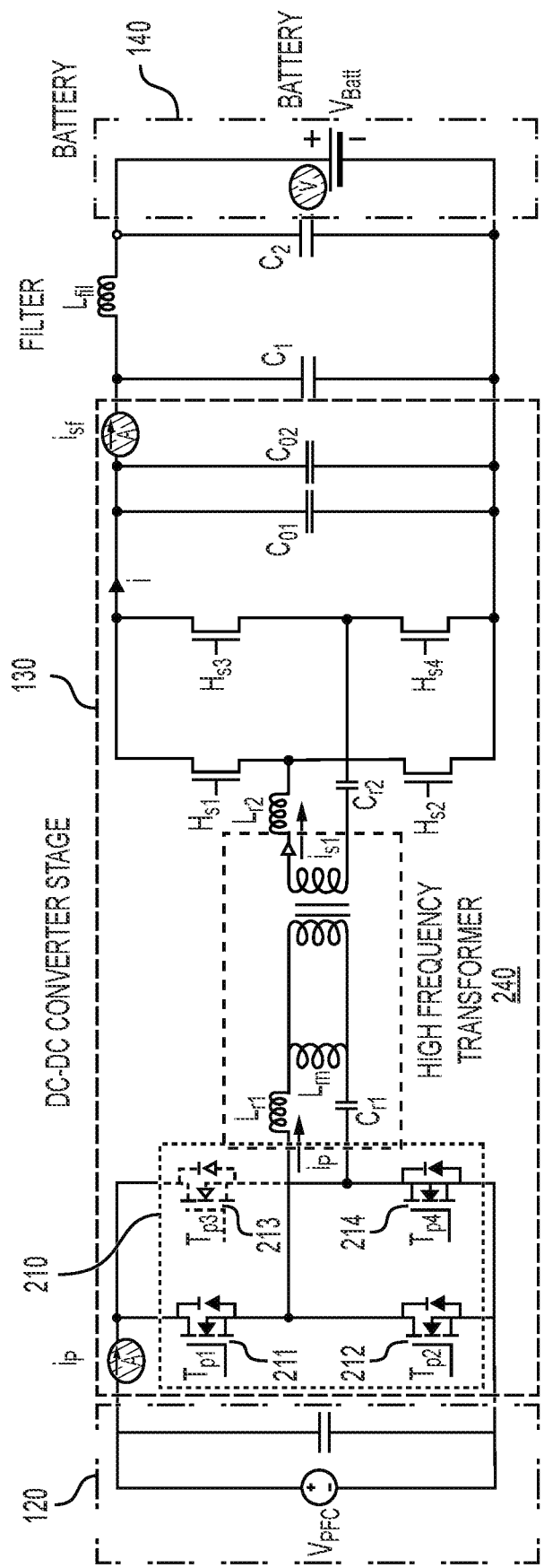
FIG. 5 depicts an exemplary electrical schematic for a battery charger with a DC-DC converter in a half bridge operation, according to one or more embodiments.

FIG. 5 depicts an exemplary electrical schematic for a battery charger with a configurable DC-DC converter in a half bridge driver operation, according to one or more embodiments. The structure of battery charger 100 is described above, with reference to FIG. 2.

As shown in FIG. 5, battery charger 100 may be configured to operate in a half bridge driver configuration on a primary side of transformer 240. For the half bridge driver operation, switches on the primary side of transformer 240 may be controlled so that primary first switch 211 and primary second switch 212 are operated to generate a voltage signal, primary third switch 213 is opened, and primary fourth switch 214 is closed.

As shown in FIG. 5, battery charger 100 may be configured to operate in a half bridge driver configuration on a primary side of transformer 240. For example, the half bridge driver operation may be used in a low voltage region 810 (see FIG. 8) when a voltage of battery 140 ranges from 360 V to 450 V, for example. However, the disclosure is not limited thereto. The half bridge driver operation may be used for any operation of the battery charger 100 as desired, and the low voltage region 810 may range between any appropriate voltage levels.

Figure 6:
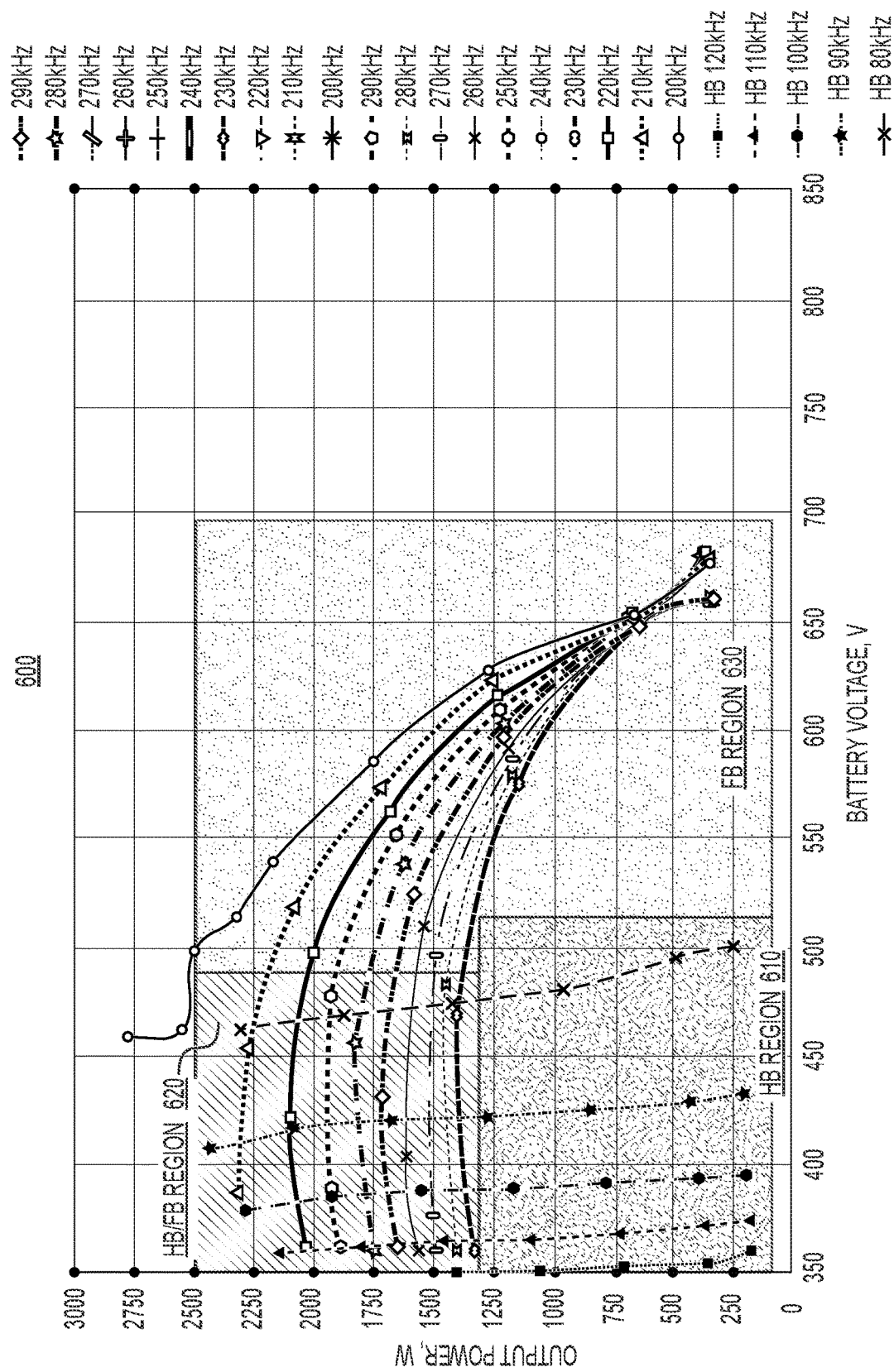
FIG. 6 depicts an exemplary mode transition graph for a battery charger with a DC-DC converter, according to one or more embodiments.

FIG. 6 depicts an exemplary mode transition graph 600 for a battery charger with a DC-DC converter.

FIG. 6 shows the implementation of the battery charger 100 to charge the battery 140 with variable power. In FIG. 6, the current can be increased to provide enough charging, even at lower battery voltages. FIG. 6 depicts half-bridge region 610, half-bridge or full-bridge region 620, and full-bridge region 630. For example, near a battery voltage of 350 V and for an output power of 1 kW, battery charger 100 may operate in a half-bridge configuration with a switching frequency of 120 kHz. For example, near a battery voltage of 365 V and for an output power of 1.1 kW, battery charger 100 may operate in a half-bridge configuration with a switching frequency of 109 kHz. For example, near a battery voltage of 400 V and for an output power of 2 kW, battery charger 100 may operate in a half-bridge configuration with a switching frequency of 220 kHz. For example, near a battery voltage of 550 V and for an output power of 2 kW, battery charger 100 may operate in a full-bridge configuration with a switching frequency of 200 kHz. For example, near a battery voltage of 600 V and for an output power of 2 kW, battery charger 100 may operate in a half-bridge configuration with a switching frequency of 68 kHz. For example, near a battery voltage of 650 V and for an output power of 2 kW, battery charger 100 may operate in a full-bridge configuration with a switching frequency of 151 kHz. For example, near a battery voltage of 800 V and for an output power of 3.6 kW, battery charger 100 may operate in a full-bridge configuration with a switching frequency of 96.7 kHz.

Figure 7:
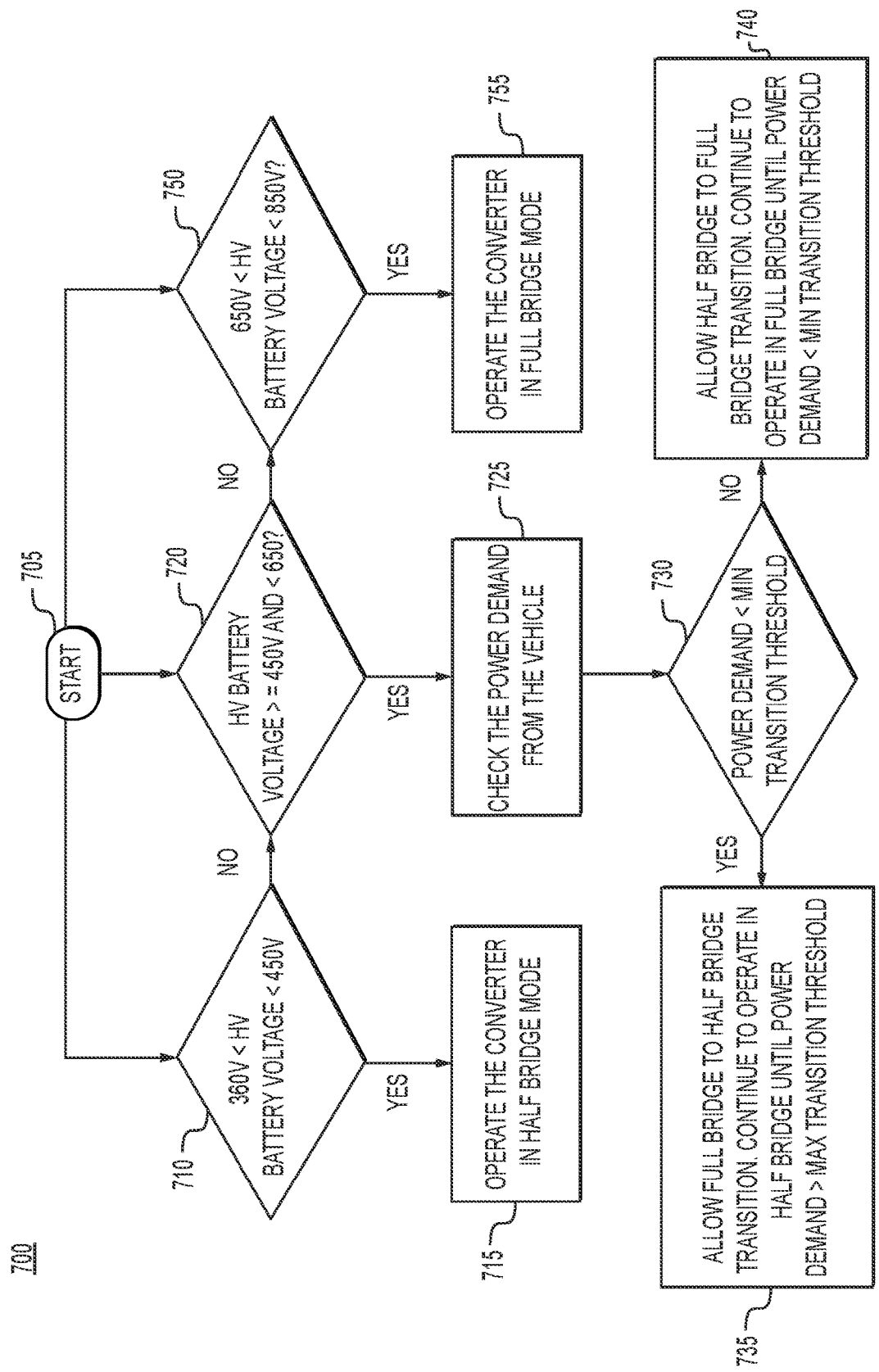
FIG. 7 depicts an exemplary mode operation control for a battery charger with a DC-DC converter, according to one or more embodiments.

FIG. 7 depicts an exemplary mode operation control for a battery charger with a DC-DC converter, according to one or more embodiments.

Figure 8:
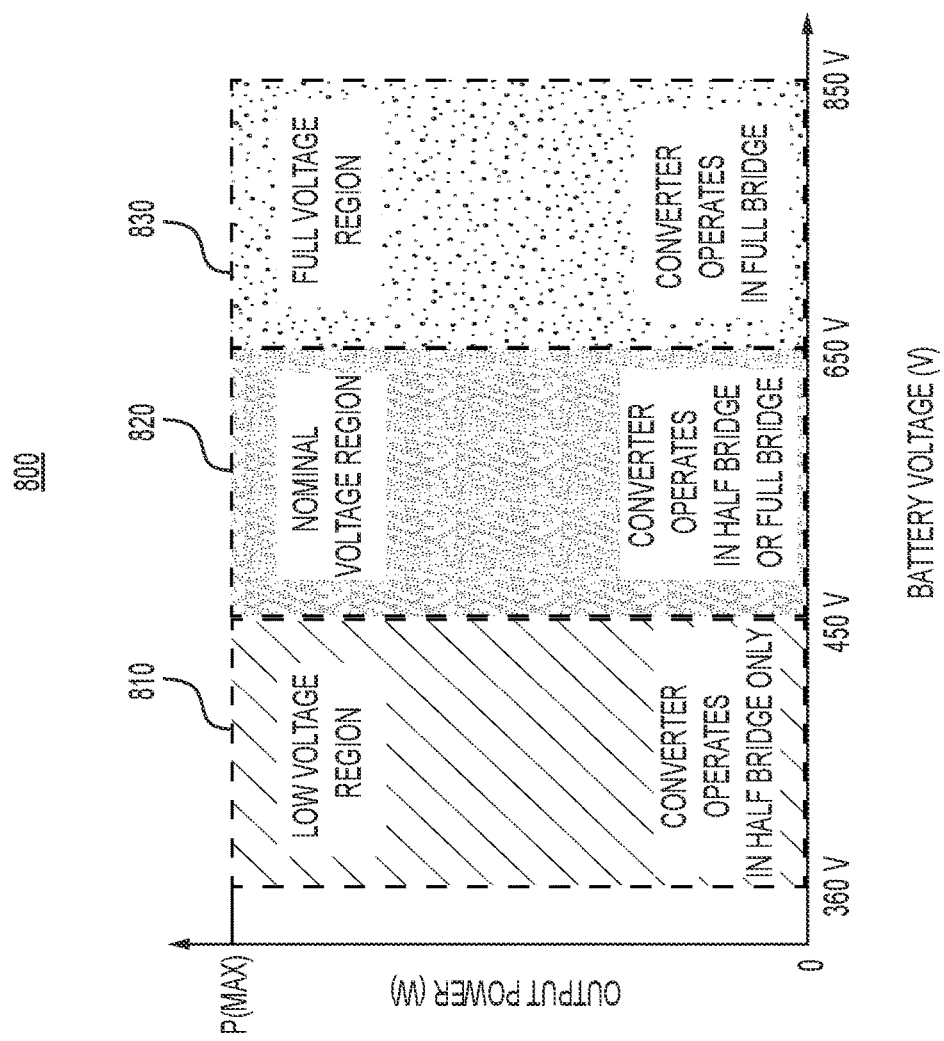
FIG. 8 depicts an exemplary voltage operation control for a battery charger with a DC-DC converter, according to one or more embodiments.

Method 700 may control a system including DC-DC converter 130 and may include performing, by controller 300, various operations of method 700. Operation 705 may include observing one or more of a voltage of battery 140, an input grid voltage, a DC link voltage, a power requirement, and a state of charge (SOC) of battery 140. Operation 710 may include comparing a voltage of battery 140 with a first reference voltage (for example, 360 V as shown in FIG. 8) and a second reference voltage (for example, 450 V as shown in FIG. 8). When the voltage of battery 140 is greater than the first reference voltage and less than the second reference voltage (yes in operation 710), operation 715 may include controlling the operation of the bridge driver 210 to operate in a half-bridge driver configuration.

When the voltage of battery 140 is greater than the second reference voltage (no in operation 710), operation 720 may include comparing a voltage of battery 140 with the second reference voltage (for example, 450 V as shown in FIG. 8) and a third reference voltage (for example, 650 V as shown in FIG. 8). When the voltage of battery 140 is greater than or equal to the second reference voltage and less than the third reference voltage (yes in operation 720), operation 725 may include checking a power demand for the DC-DC converter, such as from a vehicle, for example. Operation 730 may include comparing the power demand to a minimum transition threshold.

When the power demand is less than the minimum transition threshold (yes in operation 730), operation 735 may include controlling the operation of the bridge driver 210 to transition from a full-bridge driver configuration to a half-bridge driver configuration. Operation 735 may further include controlling the operation of the bridge driver 210 to operate in the half-bridge driver configuration until the power demand from the vehicle is greater than a maximum transition threshold.

When the power demand is greater than or equal to the minimum transition threshold (no in operation 730), operation 740 may include controlling the operation of the bridge driver 210 to transition from a half-bridge driver configuration to a full-bridge driver configuration. Operation 740 may further include controlling the operation of the bridge driver 210 to operate in the full-bridge driver configuration until the power demand from the vehicle is less than the minimum transition threshold.

When the voltage of battery 140 is greater than or equal to the third reference voltage (no in operation 720), operation 750 may include comparing the voltage of battery 140 with the third reference voltage (for example, 650 V as shown in FIG. 8) and a fourth reference voltage (for example, 850 V as shown in FIG. 8). When the voltage of battery 140 is greater than the third reference voltage and less than the fourth reference voltage (yes in operation 750), operation 755 may include controlling the operation of the bridge driver 210 to operate in a full-bridge driver configuration.

FIG. 8 depicts an exemplary voltage operation control 800 for a battery charger with a DC-DC converter, according to one or more embodiments.

As shown in FIG. 8, battery charger 100 and DC-DC converter 130 may be operated in different configurations based on different battery voltages. For example, DC-DC converter 130 may be operated in a half bridge driver configuration in a low voltage region 810 when a voltage of battery 140 is in a first range from 360 V to 450 V. DC-DC converter 130 may be operated in a half bridge driver configuration or a full bridge driver configuration in a nominal voltage region 820 when a voltage of battery 140 is in a second range from 450 V to 650 V. DC-DC converter 130 may be operated in a full bridge driver configuration in a full voltage region 830 when a voltage of battery 140 is in a third range from 650 V to 850 V. Here, the first range as low voltage region 810, the second range as nominal voltage region 820, and the third range as full voltage region 830 are provided as non-overlapping ranges increasing from smallest to largest voltage values. However, these are merely examples, and the disclosure is not limited to the configurations or voltage levels described above. For example, for a 400 V system, the voltage regions 810, 820, and 830 may be non-overlapping ranges from 170 V to 200 V, from 200 V to 300 V, and from 300 V to 450 V, respectively.

Figure 9:
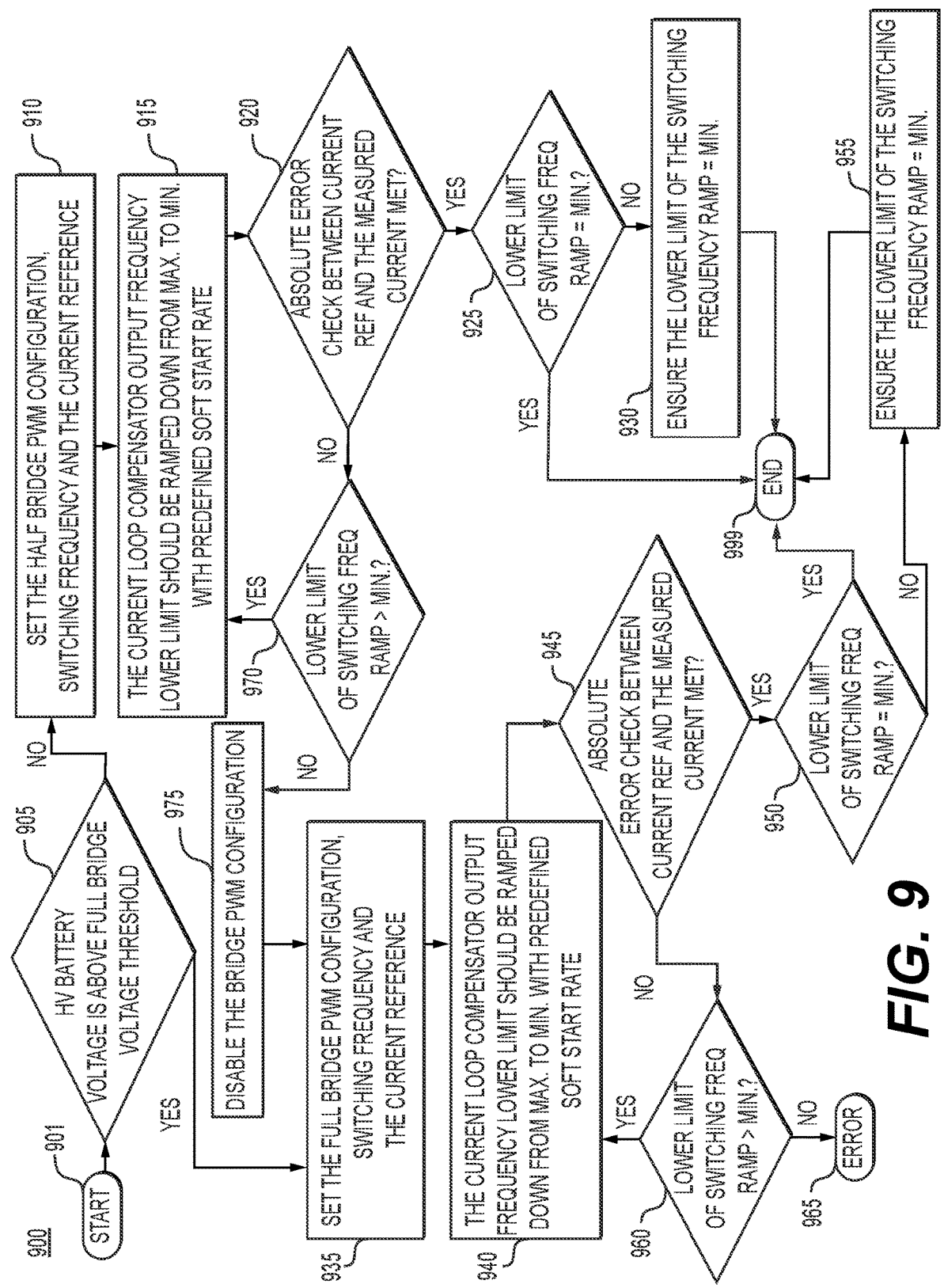
FIG. 9 depicts a flowchart of a method of operating a battery charger with a soft-start DC-DC converter, according to one or more embodiments.

FIG. 9 depicts a flowchart of a method of operating a battery charger with a soft-start DC-DC converter, according to one or more embodiments.

Method 900 may control a system including DC-DC converter 130 and may include performing, by controller 300, various operations of method 900. Operation 901 may include observing one or more of a voltage of battery 140, an input grid voltage, a DC link voltage, a power requirement, and a state of charge (SOC) of battery 140. Operation 905 may include comparing a voltage of battery 140 with a full bridge voltage threshold. When the voltage of battery 140 is below the full bridge voltage threshold (no in operation 905), operation 910 may include controlling the operation of the bridge driver 210 to operate in a half-bridge driver configuration, and setting a switching frequency and a current reference. Operation 915 may include ramping down a current loop compensator output frequency lower limit from a maximum to a minimum with a predetermined soft start rate. Operation 920 may include comparing a current reference and a measured current to determine whether an absolute error check is met.

When the absolute error check is met (yes in operation 920), operation 925 may include comparing a lower limit of the switching frequency ramp to a minimum. When the lower limit of the switching frequency ramp is equal to the minimum (yes in operation 925), the soft start method 900 may end at operation 999. When the lower limit of the switching frequency ramp is not equal to the minimum (no in operation 925), operation 930 may include ensuring the lower limit of the switching frequency ramp is equal to the minimum, and ending the soft start method 900 at operation 999.

When the absolute error check is not met (no in operation 920), operation 970 may include comparing a lower limit of the switching frequency ramp to a minimum. When the lower limit of the switching frequency ramp is greater than the minimum (yes in operation 970), method 900 may progress to operation 915, which may include ramping down a current loop compensator output frequency lower limit from a maximum to a minimum with a predetermined soft start rate, and continue as described above.

When the lower limit of the switching frequency ramp is less than the minimum (no in operation 970), operation 975 may include disabling the bridge PWM configuration. Operation 935 may include controlling the operation of the bridge driver 210 to operate in a full-bridge driver configuration, and setting a switching frequency and a current reference.

When the voltage of battery 140 is above the full bridge voltage threshold (yes in operation 905), method 900 may progress to operation 935. Operation 940 may include ramping down a current loop compensator output frequency lower limit from a maximum to a minimum with a predetermined soft start rate. Operation 945 may include comparing a current reference and a measured current to determine whether an absolute error check is met.

When the absolute error check is met (yes in operation 945), operation 950 may include comparing a lower limit of the switching frequency ramp to a minimum. When the lower limit of the switching frequency ramp is equal to the minimum (yes in operation 950), the soft start method 900 may end at operation 999. When the lower limit of the switching frequency ramp is not equal to the minimum (no in operation 950), operation 955 may include ensuring the lower limit of the switching frequency ramp is equal to the minimum, and ending the soft start method 900 at operation 999.

When the absolute error check is not met (no in operation 945), operation 960 may include comparing a lower limit of the switching frequency ramp to a minimum. When the lower limit of the switching frequency ramp is greater than the minimum (yes in operation 960), method 900 may progress to operation 940 and continue as described above. When the lower limit of the switching frequency ramp is less than the minimum (no in operation 960), method 900 may generate an error at operation 965.

Figure 10:
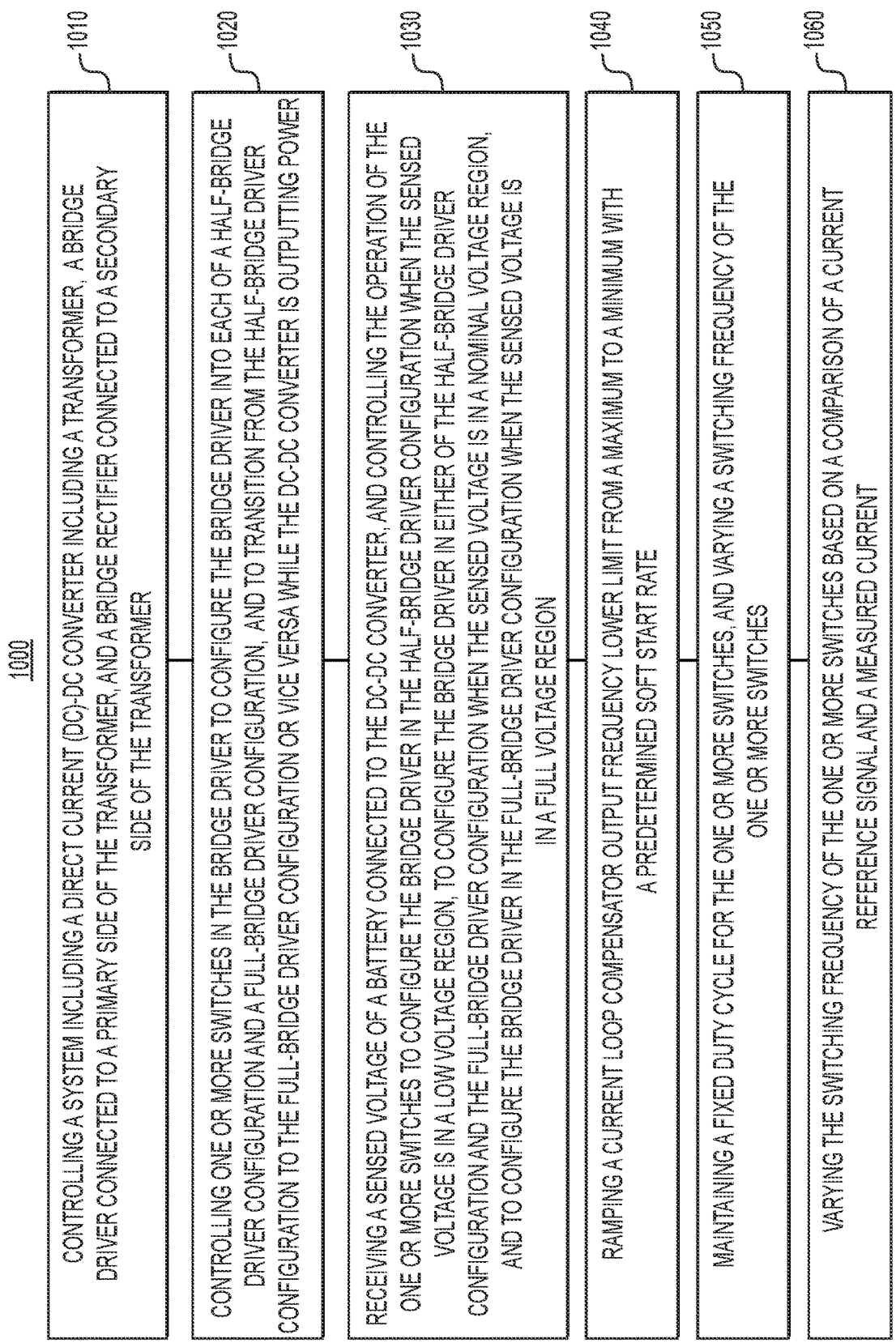
FIG. 10 depicts a flowchart of a method of operating a battery charger with a DC-DC converter, according to one or more embodiments.

FIG. 10 depicts a flowchart of a method of operating a battery charger with a DC-DC converter, according to one or more embodiments.

Method 1000 may control a system including DC-DC converter 130 and may include performing, by controller 300, various operations of method 1000. Operation 1010 may include controlling a system including a DC-DC converter 130 including a transformer 240, a bridge driver 210 connected to a primary side of the transformer 240, and a bridge rectifier connected to a secondary side of the transformer 240. Operation 1020 may include controlling one or more switches (211, 212, 213, or 214) in the bridge driver 210 to configure the bridge driver 210 into each of a half-bridge driver configuration and a full-bridge driver configuration, and to transition between the half-bridge driver configuration and the full-bridge driver configuration while the DC-DC converter 130 is outputting power.

Operation 1030 may include receiving a sensed voltage of a battery 140 connected to the DC-DC converter 130, and controlling the operation of the one or more switches (211, 212, 213, or 214) to configure the bridge driver 210 in the half-bridge driver configuration when the sensed voltage is in a low voltage region 810, to configure the bridge driver 210 in either of the half-bridge driver configuration and the full-bridge driver configuration when the sensed voltage is in a nominal voltage region 820, and to configure the bridge driver 210 in the full-bridge driver configuration when the sensed voltage is in a full voltage region 830.

Operation 1040 may include ramping a current loop compensator output frequency lower limit from a maximum to a minimum with a predetermined soft start rate. Operation 1050 may include maintaining a fixed duty cycle for the one or more switches (211, 212, 213, or 214), and varying a switching frequency of the one or more switches (211, 212, 213, or 214). Operation 1060 may include varying the switching frequency of the one or more switches (211, 212, 213, or 214) based on a comparison of a current reference signal and a measured current.

Above, several examples of different configurations of DC-DC converter 130 and battery charger 100 are provided. However, the disclosure is not limited to the examples provided above. Additionally, any appropriate voltages or other signals may be used to control the operation of the switches discussed above.

A battery charger 100 according to the disclosure may operate with multiple types of AC input power supplies, including single phase, split/dual/two phase, and three-phase power supplies. The battery charger 100 may be compatible with a wide range of operation. The algorithms may ensure the operation of the DC-DC converter 130 with wide variations in input voltages to generate a wide range of output voltages. By providing different configurations, the battery charger 100 may reduce current delivered to individual devices of battery charger 100 to reduce stress on the devices. A battery charger 100 according to the disclosure may attain lower voltage across each switch on the secondary side of transformer 240 with enhanced performance. This lower voltage across each switch may allow the use of lower voltage devices. An advantage to at least some of the disclosed systems and methods is a singular resonant topology that may offer a seamless transition between half-bridge and full-bridge modes of operation and vice versa depending upon the HVDC battery voltage and the output power conditions. An advantage to at least some of the disclosed systems and methods is a soft start operation that may be a software solution which ensures a smooth startup of the converter and determines the expected mode of operation (half-bridge or full-bridge) without requiring any additional hardware circuitry.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for a direct current (DC)-DC converter, the system comprising:
   a transformer;
   a bridge driver connected to a primary side of the transformer, the bridge driver including one or more switches;
   a bridge rectifier connected to a secondary side of the transformer; and
   a controller configured to control the operation of the one or more switches based on a sensed voltage of a battery connected to the DC-DC converter and a power demand for the DC-DC converter,
   wherein the one or more switches in the bridge driver are operable to configure the bridge driver into each of a half-bridge driver configuration and a full-bridge driver configuration,
   wherein the controller is further configured to control the operation of the one or more switches to transition between the half-bridge driver configuration and the full-bridge driver configuration while the DC-DC converter is outputting power,
   wherein the controller is further configured to ramp a current loop compensator output frequency lower limit from a maximum to a minimum with a predetermined soft start rate, and
   wherein the controller is further configured to maintain a fixed duty cycle for the one or more switches with the predetermined soft start rate, and vary a switching frequency of the one or more switches with the predetermined soft start rate.

2. The system of claim 1, wherein the power demand is a signal from a vehicle to the DC-DC converter.

3. The system of claim 1, wherein the one or more switches include a first bridge driver switch and a second bridge driver switch on a first leg of the bridge driver, and a third bridge driver switch and a fourth bridge driver switch on a second leg of the bridge driver.

4. The system of claim 3, wherein the controller is configured to control the operation of the one or more switches to configure the bridge driver into the half-bridge driver configuration by controlling the third bridge driver switch to be open and the fourth bridge driver switch to be closed.

5. The system of claim 1, wherein the controller is further configured to control the operation of the one or more switches to configure the bridge driver in the half-bridge driver configuration when the sensed voltage of the battery connected to the DC-DC converter is in a low voltage region, to configure the bridge driver in either of the half-bridge driver configuration or the full-bridge driver configuration when the sensed voltage is in a nominal voltage region, and to configure the bridge driver in the full-bridge driver configuration when the sensed voltage is in a full voltage region.

6. The system of claim 5, wherein the controller is further configured to, when the sensed voltage is in the nominal voltage region, check the power demand of the DC-DC converter, and
   when the power demand is less than a minimum transition threshold, operating the bridge driver in the half-bridge driver configuration, and
   when the power demand is more than the minimum transition threshold, operating the bridge driver in the full-bridge driver configuration.

7. The system of claim 1, wherein the controller is further configured to vary the switching frequency of the predetermined soft start rate based on continuously comparing a current reference signal and a measured current.

8. The system of claim 1, wherein the DC-DC converter has a voltage operating range from approximately 170V to approximately 850V at a battery interface connected to the bridge rectifier.

9. The system of claim 1, further comprising an alternating current (AC) to direct current (DC) Power Factor Correction (PFC) converter connected to the bridge driver to provide the system as a battery charger.

10. The system of claim 9, further comprising:
    a battery connected to the DC-DC converter of the battery charger, and
    a motor configured to rotate based on power received from the battery,
    wherein the system is provided as a vehicle.

11. The system of claim 10, wherein the battery charger is configured to:
    receive input AC power through the PFC converter, convert the AC power to DC power, and provide the DC power to the battery to charge the battery, and
    receive DC power from the battery through the DC-DC converter, convert the DC power to AC power, and provide the AC power through the PFC converter as output AC power.

12. The system of claim 1, wherein the transformer includes a high-frequency transformer provided in a resonant tank.

13. A method for controlling a system including a direct current (DC)-DC converter including a transformer, a bridge driver connected to a primary side of the transformer, the bridge driver including one or more switches, and a bridge rectifier connected to a secondary side of the transformer, the method comprising performing, by a controller, operations including:
    controlling the one or more switches in the bridge driver to configure the bridge driver into each of a half-bridge driver configuration and a full-bridge driver configuration based on a sensed voltage of a battery connected to the DC-DC converter and a power demand for the DC-DC converter, and to transition between the half-bridge driver configuration and the full-bridge driver configuration while the DC-DC converter is outputting power,
    wherein the operations further include ramping a current loop compensator output frequency lower limit from a maximum to a minimum with a predetermined soft start rate, and
    wherein the operations further include maintaining a fixed duty cycle for the one or more switches with the predetermined soft start rate, and varying a switching frequency of the one or more switches with the predetermined soft start rate.

14. The method of claim 13, wherein the operations further include receiving the sensed voltage of the battery connected to the DC-DC converter, and
    wherein the controlling the switching operation includes controlling the operation of the one or more switches to configure the bridge driver in the half-bridge driver configuration when the sensed voltage is in a low voltage region, to configure the bridge driver in either of the half-bridge driver configuration or the full-bridge driver configuration when the sensed voltage is in a nominal voltage region, and to configure the bridge driver in the full-bridge driver configuration when the sensed voltage is in a full voltage region.

15. The method of claim 13, wherein the varying the switching frequency of the one or more switches of the predetermined soft start rate is based on continuously comparing of a current reference signal and a measured current.

16. A non-transitory computer readable medium storing instructions that, when executed by one or more processors, perform operations including:
   controlling one or more switches in a bridge driver of a DC-DC converter to configure the bridge driver into each of a half-bridge driver configuration and a full-bridge driver configuration based on a sensed voltage of a battery connected to the DC-DC converter and a power demand for the DC-DC converter, and to transition between the half-bridge driver configuration and the full-bridge driver configuration while the DC-DC converter is outputting power,
   wherein the operations further include ramping a current loop compensator output frequency lower limit from a maximum to a minimum with a predetermined soft start rate, and
   wherein the operations further include maintaining a fixed duty cycle for the one or more switches with the predetermined soft start rate, and varying a switching frequency of the one or more switches with the predetermined soft start rate.

* * * * *